(12) United States Patent
Andres Del Valle et al.

(10) Patent No.: US 9,563,899 B2
(45) Date of Patent: Feb. 7, 2017

(54) MEDIA DISTRIBUTION ARCHITECTURE FOR TELEVISION VIEWING

(75) Inventors: Ana Cristina Andres Del Valle, Juan les Pins (FR); Kelly L. Dempski, Evanston, IL (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 582 days.

(21) Appl. No.: 13/249,778

(22) Filed: Sep. 30, 2011

(65) Prior Publication Data

US 2012/0096485 A1  Apr. 19, 2012

(30) Foreign Application Priority Data

Oct. 15, 2010 (EP) ..................................... 10306127

(51) Int. Cl.
*H04N 5/445* (2011.01)
*G06Q 30/02* (2012.01)
*H04N 21/45* (2011.01)

(52) U.S. Cl.
CPC ............... *G06Q 30/02* (2013.01); *H04N 21/45* (2013.01)

(58) Field of Classification Search
CPC ...................................................... H04N 21/45
USPC ...................................................... 725/42, 46
See application file for complete search history.

(56) References Cited

U.S. PATENT DOCUMENTS

| | | | | |
|---|---|---|---|---|
| 2002/0056086 A1* | 5/2002 | Yuen | .................. | H04N 7/17318 725/9 |
| 2008/0109843 A1* | 5/2008 | Ullah | ..................... | G06Q 30/02 725/34 |
| 2008/0178241 A1* | 7/2008 | Gilboy | ............... | H04N 7/17318 725/114 |
| 2009/0217320 A1 | 8/2009 | Aldrey | | |
| 2010/0063878 A1* | 3/2010 | Bachet | ............... | G06Q 30/0251 705/14.49 |
| 2011/0023060 A1* | 1/2011 | Dmitriev et al. | ................ | 725/34 |
| 2011/0088054 A1* | 4/2011 | Malik et al. | ..................... | 725/29 |
| 2011/0167452 A1* | 7/2011 | Baumgartner et al. | ......... | 725/44 |
| 2011/0264519 A1* | 10/2011 | Chan | ....................... | G06Q 30/02 705/14.49 |
| 2012/0004983 A1* | 1/2012 | Borthwick | ............. | G06Q 30/02 705/14.45 |

FOREIGN PATENT DOCUMENTS

EP  2271097  1/2011
WO  WO-2009/128515  10/2009

OTHER PUBLICATIONS

Video entitled, "Multichannel Customer Interaction: Web2TV2Web Platform", available at: http://www.youtube.com/watch?v=SE3Jjln2ikk, posted Mar. 7, 2011. Transcription attached.

* cited by examiner

*Primary Examiner* — Michael Hong
(74) *Attorney, Agent, or Firm* — Mannava & Kang, P.C.

(57) ABSTRACT

A system distributes digital media content to a plurality of user devices, where a given user is associated with multiple user devices. First content is provided by a controller to a first user device and, in response, the controller determines interaction by the user with the first content. Thereafter, the controller provides second content to a second user device based on the prior provision of the first user content to the first user device and the first interaction information. More extensive user interaction history as well as device types may also be employed by the controller when determining the second content.

26 Claims, 4 Drawing Sheets

MEDIA DISTRIBUTION ARCHITECTURE FOR TELEVISION VIEWING

FIELD

The present disclosure relates to systems and methods for distributing digital media content to a plurality of televisions, and in particular to the distribution of marketing content via a web-to-television system.

BACKGROUND

Web-to-television systems allow content from the Internet to be accessed interactively by a user via a television display. In particular, while television displays are adapted to receive and display a television broadcast, for example received via a satellite signal, ADSL (Advanced Digital Subscriber Line) connection, cable connection or the like, all or the majority of the information transmission is one-way to the television, meaning that there are limited possibilities for user interaction, such as surfing the web. However, web-to-TV systems generally comprise a hardware platform supporting far greater connectivity. In particular, while a television broadcast is still received via a mostly one-way broadcast, an Internet connection is provided in parallel, for example via an ADSL or cable connection. Internet content may then be displayed alongside the television broadcast on the television display.

The possibilities for product or brand marketing campaigns in a one-way television transmission system are limited, and generally comprise only 30-second video advertisements inserted in "commercial breaks" in-between television programs. On the other hand, with a web-to-TV system, the possibilities for new forms of marketing are greatly improved, including the use of advertising banners, web pages, Interactive advertisements, etc.

However, there are technical difficulties in implementing a system for distributing digital content in a web-to-TV system.

SUMMARY

It is an aim of embodiments of the present disclosure to at least partially address one or more problems in the prior art.

According to one aspect of the present disclosure, there is provided a system for distributing digital media content to a plurality of web-to-TV platforms each adapted to display said digital media content on at least one television display in addition to a television broadcast, the system comprising: a server arranged to identify, based on a digital identification code associated with one of said web-to-television platforms, a platform type of said web-to-television platform; and a switch adapted to route said digital media content to said platform via one of a plurality of communications modules selected based on said identified type.

According to one embodiment, based on said identified platform type, said server is arranged to adapt a timing of the transmission of said digital media content to said platform.

According to another embodiment, said switch is further adapted to route communication signals from said platform to one of said plurality of communications modules based on said identified type.

According to another embodiment, the server is coupled to the internet for allowing content from the internet to be supplied to said platform.

According to another embodiment, the system further comprises a plurality of web-to-television platforms each being of a different type and comprising a memory of a different size.

According to another embodiment, the plurality of communications modules comprises a first module arranged to adapt the format of said digital media content for a first platform type, and a second module arranged to adapt the format of said digital media content for a second platform type.

According to another embodiment, the system further comprises a content generation unit arranged to supply said digital media content to said server in a first format, wherein each of said plurality of communications modules is adapted to convert said digital media content into a different format.

According to another embodiment, the digital media content comprises one or more of: images; video; sound; and text.

According to another embodiment, the digital media content is marketing content relating to a product or brand.

According to another embodiment, the switch comprises a look-up table adapted to map said digital identification code to a platform type of said web-to-television platform.

According to another aspect of the present disclosure, there is provided a method of distributing digital media content to a plurality of web-to-television platforms, the method comprising: identifying, based on a digital identification code associated with one of said web-to-television platforms for display on a television display in addition to a television broadcast, a platform type of the platform; and routing said digital media content to said web-to-television platform via one of a plurality of communications modules selected based on said type.

According to another embodiment, the step of identifying said platform type comprises mapping said digital identification code to a platform type using a look-up table.

BRIEF DESCRIPTION OF THE DRAWINGS

The features described in this disclosure are set forth with particularity in the appended claims. These features will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Throughout the following description, only those elements useful for an understanding of the present disclosure have been described in detail. Other details, such as the particular types of television broadcast systems have not been described in detail, the disclosure being applicable to any type of television system, including satellite, cable, terrestrial, broadband etc.

Furthermore, throughout the present application, the following terms are assigned the following definitions:

digital media content (or simply "content")—any image, video, text and/or sound in electronic format; and web-to-television system, referred to hereafter as "web-to-TV"—any hardware and/or software system allowing digital media content, such as, for example, content from the internet or marketing content, to be view on a television in parallel to a normal television transmission.

Figure 1:
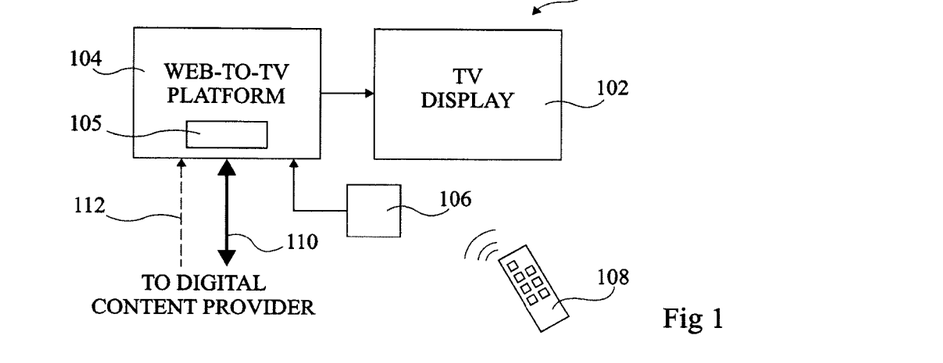
FIG. 1 illustrates schematically an overview of a web-to-television system according to an embodiment of the present disclosure.

FIG. 1 illustrates user equipment 100 enabled for web-to-TV viewing. In particular, the user equipment 100 comprises a television display 102, which is for example a flat screen display panel, such as an LED display, or other form of display device. The television display 102 is adapted to receive a television signal, such as a digital television signal transmitted for example via a satellite, terrestrial, ADSL or cable communications interface.

A web-to-TV platform 104 is provided coupled to the television display 102. Platform 104 provides internet connectivity, allowing media content retrieved from the internet to be displayed on the television display 102. In particular, the platform 104 provides an interface between the television and the Internet. The platform 104 is for example implemented in hardware and/or software, which forms part of a set-top box, games console, hard-disk recorder or the like, or could be integrated in the television 102. The platform 104 comprises a memory 105.

A remote control detector 106 is coupled to the platform 104, and allows a remote control 108 to be used to navigate the web. Alternatively or additionally a keyboard and/or mouse (not illustrated) could be provided with wired or wireless connections to the platform 104, for entering search terms, navigating menus etc.

The platform 104 communicates via a two-way communications path 110 with a digital content provider (not illustrated), for example an Internet service provider (ISP), which provides Internet access. Furthermore, an optional input 112 may allow television signals to be received from the content provider, for example over an ADSL or cable line. Alternatively, the television display 102 may receive the television broadcast directly via an aerial and a built-in decoder or tuner, or an alternative device.

The web-to-TV platform 104 could be one of a number of systems currently available on the market, such as "IPTV—Mediaroom", "Google TV", TV application for an iPad/iPhone, "Telefonica Imagenio" (Alcatel-Lucent) etc., which are merely a few examples (the names "IPTV—Mediaroom", "Google TV", "iPad", "iPhone", "Telefonica Imagenio" and "Alcatel-Lucent" are likely to correspond to registered trademarks).

Figure 2A:
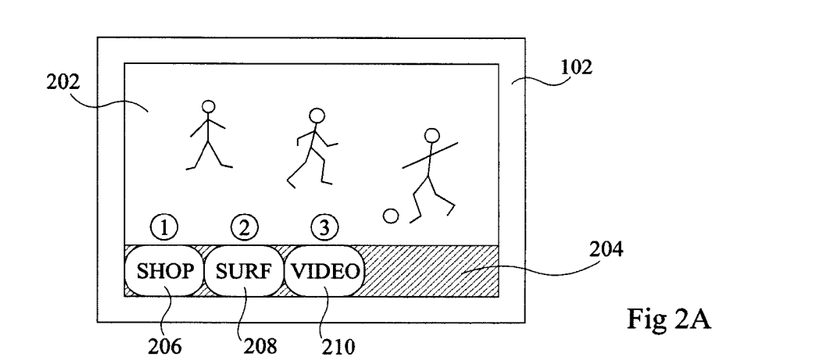
FIGS. 2A and 2B illustrate examples of screen shots of the television display of FIG. 1 according to embodiments of the present disclosure.

FIG. 2A illustrates an example of a screen shot on the display 102 of FIG. 1 during operation, in which a television broadcast 202, in this example a football match, is being displayed, and at the same time a menu bar 204 is shown at the bottom of the screen. The menu bar 204 displays three menu options selectable by a user in order to enter web-to-TV functionality. In particular, an icon 206 labeled "SHOP" can be selected to display a pop-up shopping menu, an icon 208 labeled "SURF" can be selected to open a browsing window for Internet surfing, while an icon 210 labeled "video" allows a pop-up menu for video watching to be displayed. Naturally, alternative or additional menu options could be provided.

Figure 2B:
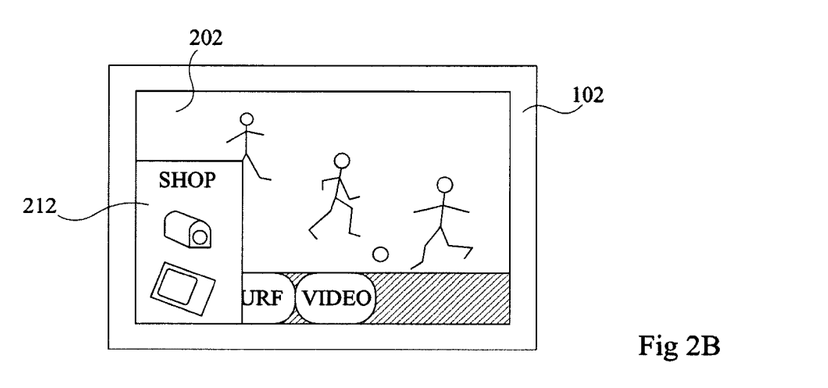

FIG. 2B illustrates an example in which a user has selected the icon 206 to display a shopping menu 212. The television transmission for example continues to be displayed on one side of the display 102. The shopping menu for example comprises a list of available products with images and/or video immediately displayed to the user, or available upon selection by the user. A search box may also be displayed, giving the user the option of entering key words via the remote control or keyboard.

Figure 3:
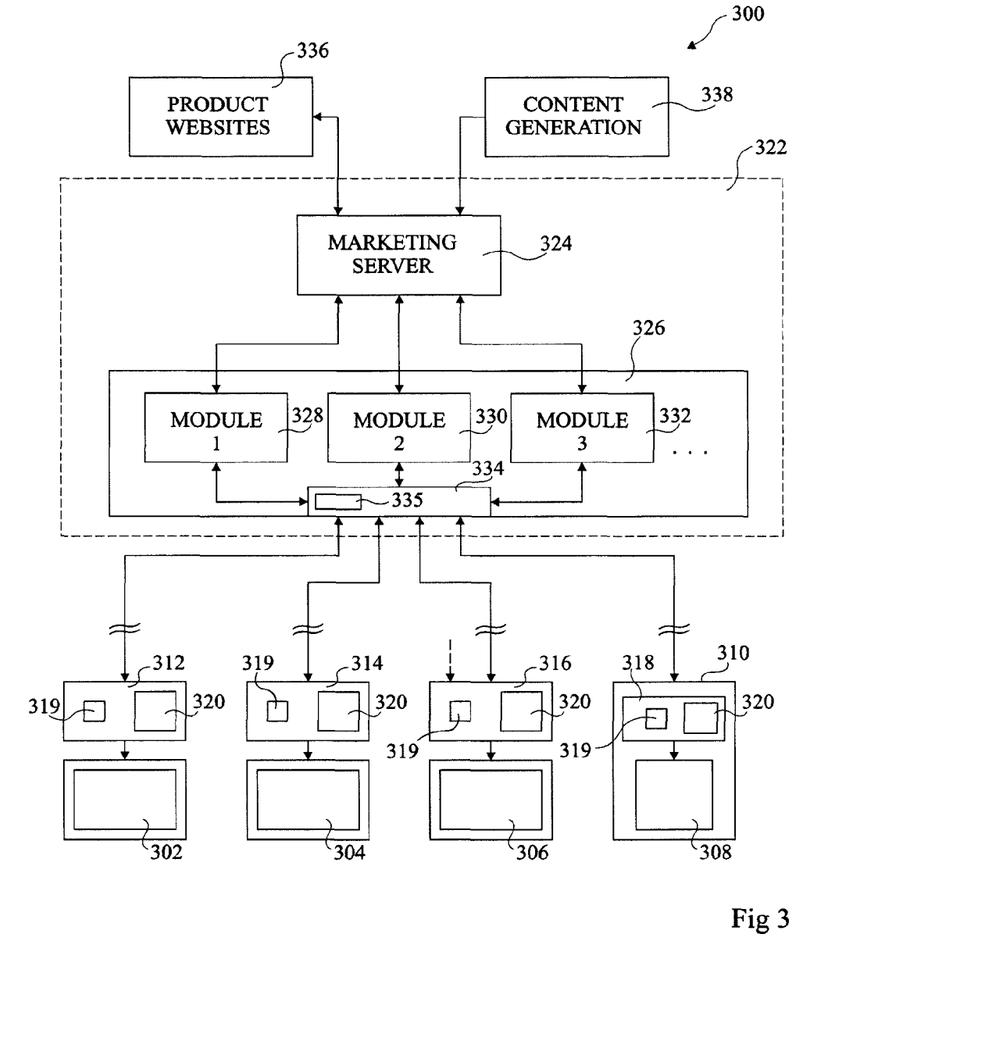
FIG. 3 is a block diagram illustrating digital media content distribution system according to an embodiment of the present disclosure.

FIG. 3 illustrates a digital media content distribution system 300, in which a number of different types of the web-to-TV platform of FIG. 1 are supported, as will now be explained in more detail.

A number of television displays 302, 304, 306 and 308, for example located in corresponding customer's homes, are adapted to display television transmissions. Displays 302, 304 and 306 are, for example, relatively large flat-screen displays such as LCD displays, adapted for viewing by one or more users, while display 308 is, for example, the relatively small display of a mobile device 310, which could be a laptop computer, or mobile telephone. Each of the displays 302 to 308 is coupled to a corresponding web-to-TV platform 312, 314, 316 and 318. Platforms 312 to 316 are for example set-top boxes, games consoles or the like, or could be integrated with the corresponding displays 302 to 306. Platform 318 is for example implemented by the mobile platform of the mobile device 310.

Each of the platforms 312 to 318 for example comprises a processor 319 that executes instructions from an instruction memory (not shown) in order to implement the web-to-TV functionalities described herein. Each platform further comprises a built-in memory 320, for buffering to some extent the incoming digital media content. The memory 320 of each platform 312 to 318 for example has a different storage capacity, allowing a different amount of digital content to be stored prior to display.

The platforms 312 to 318 for example comprise at least two different platform types. For example, platforms 312, 314 and 316 could be of a first type, while platform 318 could be of a second type. The first type of platform for example provides a user input via only on a remote control handset, comprises a large memory 320, and supports media content in HTML (HyperText Markup Language) format and video in an MPEG (Moving Picture Experts Group) format. The second type of platform for example provides user input via a keyboard and/or touch screen, contains a limited memory for buffering digital media content, and supports digital media content in XML (Extensible Markup Language) format and video in Flash format. As a further example, the formats supported could be a combination of Javascript language and Windows Media Video/Audio (WMV/WMA) file formats.

Visually, the GUI (graphical user interface) provided by each of the platforms 312 to 316 is for example also different from that of the platform 318. For example, the menu displayed on displays 302 to 306 is displayed along the bottom of the screen, as with the example of menu 204 of FIGS. 2A and 2B, whereas the menu displayed on display 308 is for example displayed along the side of the screen. Furthermore, the available screen area, and in particular the number of display pixels, for showing the pop-up menu and displaying the digital media content is for example different. As yet a further example, the supported display resolution of video images may be different for each platform. Server equipment 322 is arranged to support each platform type, and in particular the various memory sizes, file formats and GUI variations, as will now be described in more detail.

Each of the web-to-TV platforms 312 to 318 is coupled via a communications interface such as, for example, an ADSL connection over a PSTN (Public Switched Telephone Network) or cable connection, to the server equipment 322. Server equipment 322 comprises a marketing server 324, coupled to an adaptor module 326, which is arranged to support the various platform types. In particular, the adaptor module 326 comprises a number of communications modules 328, 330 and 332. Each of the communications modules is adapted to support a different type of web-to-TV platform.

For example, the module 328 is adapted to support a platform type of platforms 312, 314 and 316, which is for example an IPTV-media room system, while the module 330 is adapted to support a platform type of platform 318, which is for example an application run on an iPad or iPhone. Module 332 is adapted to support another type of platform, for example a Google TV system. In alternative embodiments, additional or fewer modules may be provided, depending on the number of types of web-to-TV platforms that is to be supported. Each of the modules 328 to 332 may be implemented by dedicated hardware, software run on general purpose processor, or a specialized processor, or a combination thereof.

Referring back to FIG. 1, depending on the particular web-to-TV platform 104 of the user equipment 100, particular display options, menu options, data input/output options and file formats can be supported by a corresponding one of the communications modules 328 to 332. Furthermore, other parameters affecting communications between the marketing server 324 and the platforms 312 to 318, such as the memory resources in each platform type, may be taken into account by the communications modules 328 to 332.

Each of the modules 328 to 332 communicates via a switch 334 with one or more platforms of the corresponding type. In particular, the switch 334 routes communications from each of the platforms to the corresponding module based on the type of platform, and likewise routes data from each of the modules 328, 330 and 332 to a particular platform based on the platform type. For example, this routing is based on the IP (internet protocol) address of the platform, although any digital code that can identify the type of platform could be used.

For example, a look-up table 335 in the switch 334 is used to map the IP addresses of the platforms to the platform types and thus the communications module via which communications will pass. The data of the look-up table is for example determined automatically the first time that a platform connects to the server equipment 322. The server equipment 322 can send an electronic request to the platform, and receive from the platform in response the information identifying its type. Alternatively, the server equipment 322 may transmit a request for this information to the television display, and the user may enter information identifying the platform type.

Each of the communications modules 328 to 332 is also coupled to the marketing server 324 in order that digital content may be requested based on the user activity on each platform. Furthermore, some digital marketing data may be pushed to the platforms 312 to 318 automatically, for example to be presented on the television displays as pop-up windows, while other marketing data may be specifically sent to the platforms, meaning that it is only downloaded to each platform in response to a specific request from the user.

The marketing server 324 provides digital media marketing data in the form of images, video, text etc., in a standardized format such as, for example, XML. The marketing server also provides access to product websites 336, for example via the Internet, by which more information and ordering information can be provided. The marketing server 324 also communicates with a content generation system 338, which for example allows the generation of digital media marketing content, which is displayed on the displays 302 to 308 via the platforms 312 to 318 respectively.

Figure 4:
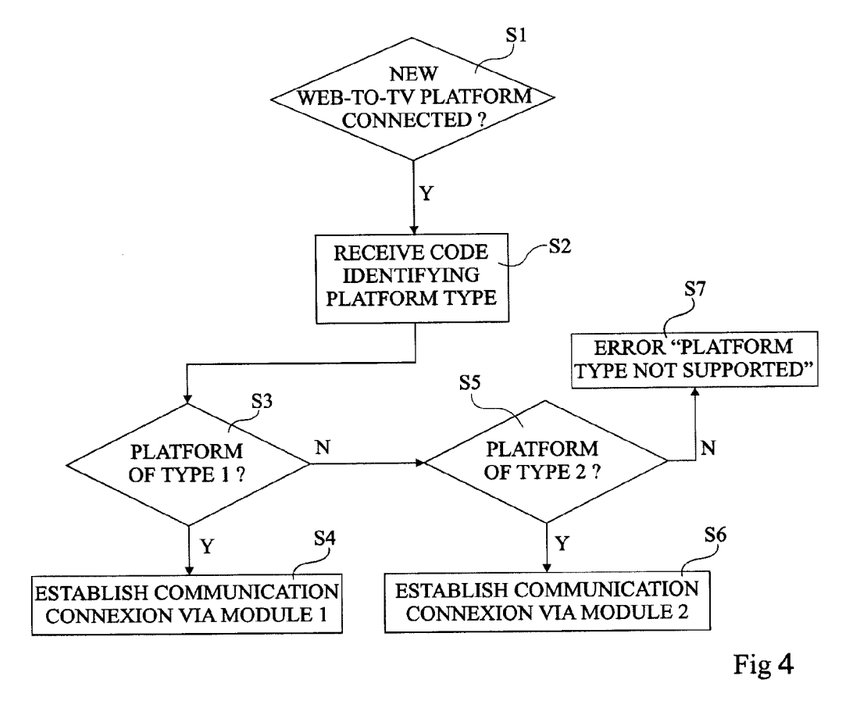
FIG. 4 is a flow diagram illustrating a method of distributing digital media content according to an embodiment of the present disclosure.

FIG. 4 is a flow diagram illustrating part of a method of distributing digital media content according to an embodiment of the present disclosure.

In a first step S1, it is determined when a new web-to-TV platform connects to the marketing server. For example, this may be detected when the web-to-TV platform is powered up, and requests a connection from the server. When a new platform is detected, the next step is S2.

In S2, a code identifying the platform type is received from the new platform. For example, an IP address associated with the platform is received, and based on the IP address, the platform type can be deduced.

The next step after S2 is S3, in which it is determined whether the platform type corresponds to a first platform type TYPE1, for example being one of the types mentioned above. If so, the next step is S4, in which a communication connection is established with the new platform via a first communication module MODULE1, which supports the platform type TYPE1. In particular, MODULE1 provides an interface between the marketing server and the new platform, such that file formats, data transmission times, visual characteristics etc. are adapted to the platform. For example, depending on the memory resources available in platforms of type TYPE1, MODULE1 will adapt the number of packets of media content downloaded to the platform in advance, and the content that should instead be streamed to the platform in real-time or near real-time.

If in step S3 it is determined that the new platform is not of type TYPE1, the next step is S5 in which it is determined whether the platform is of type TYPE2, for example being one of the types mentioned above different from TYPE1. If so, the next step is S6, in which a communication connection is established with the new platform via a second communication module MODULE2, which supports the platform type TYPE2.

However, if in step S5 it is determined that the platform is not of type TYPE2, and no other platform types are supported, the next step is S7 in which optionally an error message may for example be displayed on the television display using a universal format, indicating that the platform type is not supported. An additional communications module may then be added to the server equipment to support the new type of platform.

Figure 5:
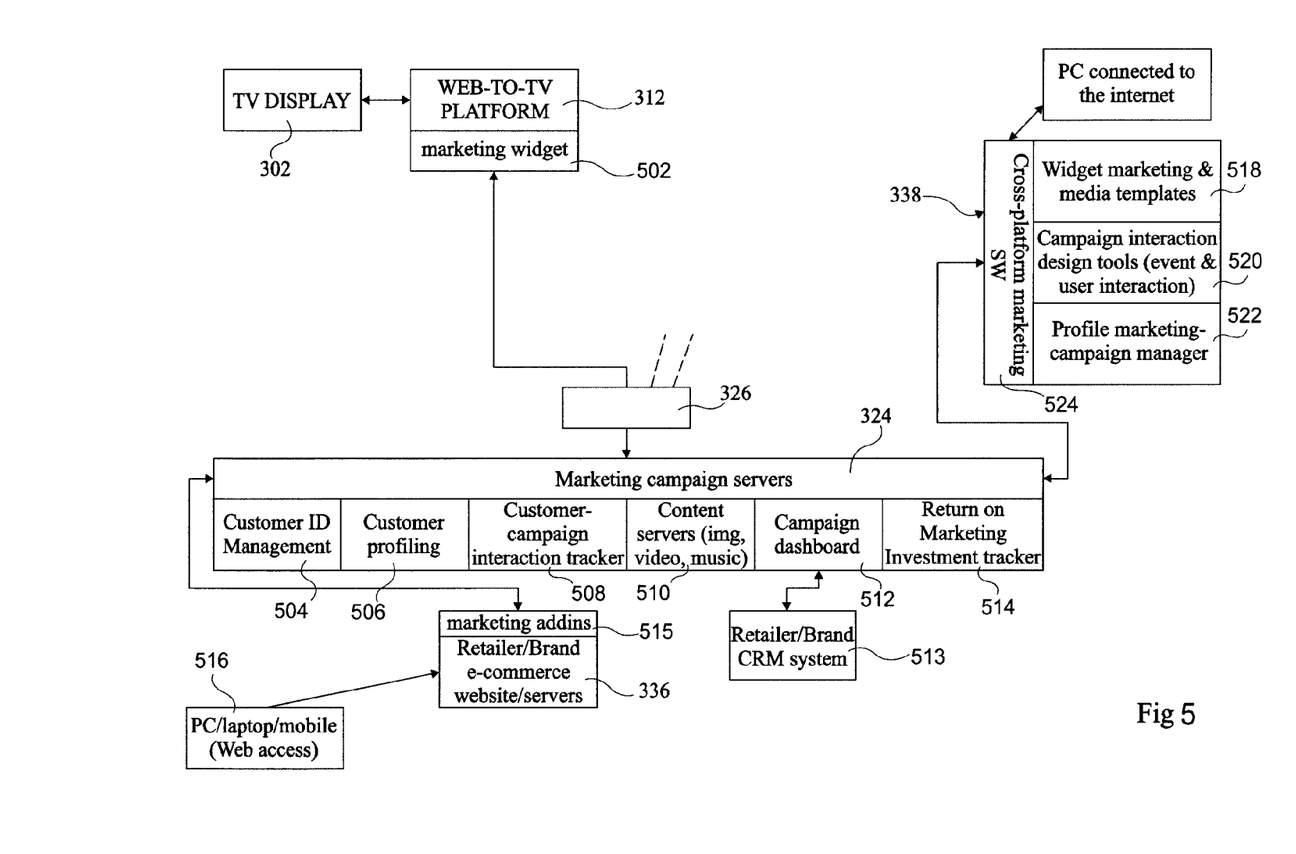
FIG. 5 illustrates part of the system of FIG. 3 in more detail according to an embodiment of the present disclosure.

The marketing server 324 and other elements of FIG. 3 are shown in more detail in FIG. 5, as will now be described. In FIG. 5, for the sake of clarity, only the television display 302 and web-to-TV platform 312 of FIG. 3 are illustrated, while obviously the adapter module 326 may be coupled to many platforms of different types.

The web-to-TV platform 312 comprises a marketing widget 502, which is a software application arranged to support the display of marketing content via the web-to-TV platform 312, and also to support other functions such as tracking user actions.

The marketing server 324 for example comprises a customer ID management unit 504, which for example automatically recognizes customers based on their IP address, or provides a login mechanism allowing customers to log in, for example if more than one customer shares a same web-to-TV platform.

A customer profiling unit 506 stores data regarding customer interests, likes and dislikes, based on customer activity. This information may then be used to direct marketing content to particular customer groups.

A customer campaign interaction tracker 508 tracks customer's actions, in order to determine a customer progression during an advertising campaign. For example, a marketing campaign may comprise a series of videos, a different one of which is displayed each time a customer requests information regarding a certain product. The campaign tracker thereby registers, for each customer, which is the next video to be displayed. Furthermore, this tracker 508 is for example used to select marketing content based on user actions. In particular, customer actions may indicate a preference for a certain type of product associated with a given brand, and new marketing content displayed to this customer could therefore be aimed at this product.

A content server 510 provides the digital media content, which can be downloaded to the web-to-TV platforms, and may include images, video, music and/or text etc. For example, a marketing campaign may involve a number of images, in the form of publicity banners that are downloaded automatically to the customer's web-to-TV platform and displayed when certain menu options are accessed.

A campaign dashboard 512 provides an interface for a retail/brand CRM (Customer Relationship Management) system 513, allowing certain data regarding an advertising campaign to be accessed by the retail/brand owner, such as the number of hits on certain pages, the number of times an advertising banner is displayed, the number of orders, etc.

A tracker unit 514 for example monitors a return on marketing investment, allowing a retail/brand owner to compare of the cost of the implementation of marketing solutions with the results achieved.

The products websites 336 for example comprise marketing add-ins 515, allowing users to pre-order goods via the website of a brand or retailer, or to track an order made via the web-to-TV platform. Furthermore, PCs, laptops of other connection devices 516 may be independently used to access the retail site, to check the status of orders that have been made.

The content generation block 338 for example comprises circuitry allowing marketing entities to submit marketing data to the marketing server 324. In particular, universal templates 518 are for example provided, indicating a standardized advertising space that is available, for example for advertising banners, video windows, etc. The universal content generated based on these templates may then be adapted for each particular platform type by the communications modules of the adapter 326. Furthermore, a campaign interactive design tools module 520 and a profile marketing campaign manager 522 may be provided, allowing marketing designers to create marketing objects and media, such as for example buttons and video, that will be associated with a specific consumer group. As an example, this may allow the color of certain items to be varied from region to region. Some of these preferences could for example be derived from an analysis of the tracking of the marketing campaigns as performed by block 508 of the marketing server.

As noted above, the marketing server 324 provides a path for providing content, such as digital media marketing content (or advertising content), to the various platforms 312 through 318 and their related displays 302 though 308. Likewise, the marketing addins 515 permit the mobile devices 516 to expand a user's interaction with such content in a coordinated fashion. Collectively, the various platforms 312 through 318 and associated displays 302 through 308, as well as the mobile devices 515, may be thought of as user devices through which any given user may access content mediated by the marketing campaign servers 324. For example, and with further reference to FIG. 5, a given user may access a given website via the TV display 302/platform 312 operating in conjunction with the marketing widget 502, as described above, and subsequently access the same website more directly via a mobile device 516, or vice versa. Furthermore, although a user as referred to herein may (and often will) comprise a single individual, a user may also refer to an entity actually comprising multiple individuals affiliated in some manner, e.g., "Mr. & Mrs. Jones", "the Smith Family", "AAA Plumbing Co.", etc. Further still, the marketing servers 324 (comprising the above-noted servers 504 through 514) may be collectively referred to as a controller in the sense that they control presentation of content to user devices as described in greater detail below.

More specifically, content from the controller may be provided to the various user devices depending on how a user accesses and interacts with the content in light of multiple user devices being used for this purpose. In this multi-device access embodiment, a user may choose to access content via a first user device, e.g., the TV display 302/platform 312 via the marketing widget 502. As noted above, the marketing widget 502 is configured to track such actions (such as accessing the controller) by the user and providing such information to the controller. In this embodiment, the controller keeps track of a user's identity and interaction with the controller via the customer ID management unit 504, for example. By tracking when a user has logged in or is otherwise interacting with the controller, the controller is further able to track the user's history regarding the content that has been provided to the user, how that content has been provided and how the user interacted with the content thus provided, as described in further detail below. In an embodiment, this may be achieved through the maintenance of user profiles by the customer ID management unit 504. For example, each user profile may be maintained as one or more database records maintained by the customer ID management unit 504. The creation and maintenance of suitable database records for this purpose is well known in the art. As part of each user profile, the customer ID management unit 504 can include identifying information regarding one or more user devices associated with the user. For example, as known in the art, a device identification code or the like may be provided to the customer ID management unit 504 each time a user logs into the controller. Further, each time a user accesses the controller, the content provided to the user via the user's then-active user device, as well as the user's interactions therewith (as tracked by the interaction tracker 508, described below), can be linked or otherwise associated with the user's profile such that presentation of specific content via specific devices can be tracked. By collecting this information across multiple user devices, controller is effectively able to maintain a "session" with a user regardless of which user devices are utilized by the user at any given time. In this context, the session is with regard to a user's overall interaction with the controller, and not to specific communications with the controller via specific devices. Although not illustrated in FIG. 5, other existing identification sources, such as loyalty card systems or CRM systems, could be tied into the customer ID management unit 504 as a means for determining when a user accesses the controller.

Furthermore, the customer ID management unit 504, aside from simply storing user identifications and tracking when a user is logged in or otherwise accessing the controller, may also rely on other sources of information to enrich the data available to the controller regarding the user and his/her preferences. For example, social media sources (e.g., "FACEBOOK", "TWITTER", etc.) can be accessed by the controller via the customer ID management unit 504 to obtain additional data regarding the user (assuming that the user has notified the controller of his/her social media accounts). Further still, the customer ID management unit 504 can augment any data obtained in this manner with data available from other sources that are not particularly related to the user. For example, if, via a social media source, the controller determines that a given user is an employee of a company named "Accenture" and is a fan of a local sports team called the "Chicago Bears", the controller can further access a different source (such as "WIKIPEDIA" web site or the like) to ascertain that "Accenture" is a multinational business and technology consulting company, and that "Chicago Bears" is a team in the National Football League.

Operating in conjunction with the customer ID management unit 504, the customer profiling unit 506, as noted above, may store the enriched data identified by the customer ID management unit 504 and further analyze it to ascertain inherent attributes about the user that may be used to decide which content should be provided to the user. To this end, the customer profiling unit 506 may analyze each user profile to identify certain characteristics within each profile that are useful in predicting the likelihood that a user will positively engage with given content. For example, the customer profiling unit 506 could ascertain that a first user has worked at a large corporation for 10+ years, whereas a second user is a teenage girl that posts daily on social media websites. Based on past interactions with other users, the controller may know (using the techniques described herein) that the first user's characteristics are a good predictor for success of "content A", whereas the second user's statistics are a better predictor for success of "content B". Based on this, the customer profiling unit 506 facilitates the decision that "content A" should be presented to the first user and that "content B" should be presented to the second user.

Furthermore, the customer profiling unit 506 also processes user actions for the same purpose of determining attributes about a user. As noted above, such user actions may be captured and tracked by the marketing widget 502 or some other tracking component dependent upon the particular type of user device used to access the controller (e.g., a website 336 equipped with the marketing addins 515). Techniques for permitting the marketing widget 502 and/or marketing addins 515 to capture user interactions are well known in the art and are therefore not described in further detail here. Regardless of how it is collected from the user device, the data concerning user actions may be provided to the interaction tracker 508 that, as noted above, tracks what content has been previously provided to a user and a user's actions relative to any given piece of content. Once again, while the content provided to the user may encompass virtually any type or form (e.g., purchased or freely broadcast, concerning a wide variety of topics, produced in particular formats, etc.), in a particular embodiment, the content comprises advertising content (i.e., content designed to persuade a recipient thereof to take some action with respect to products, ideas, or services) that may also form a part of a larger advertising campaign. To this end, the interaction tracker 508 may create records storing a user's actions for specific pieces of content that are indexed according to unique identifiers and/or according to shared characteristics about that content. For example, for content uniquely identified as "Ford F-150, 2011, Super Bowl television ad", any interactions by the user with this content would be stored in a record indexed by that identifier. Alternatively, or additionally, the user's interactions with this content may be used to update records indexed according to general characteristics applicable to that content as well as others, i.e., "automotive", "television", "sporting event", etc. Furthermore, leveraging the data about individual users provided by the customer profiling unit 506, characteristics about individual users may be effectively linked to their actions. That is, in one example, the fact that a user's occupation is an attorney may be associated with that user's frequent purchase of products in response to advertising content of a certain type.

Collectively, a given user's actions in connection with and in response to content are referred to herein as interaction information and may comprise, by way of non-limiting example, user input received by a user device in selecting content (as in the case of a user selecting a so-called web banner or banner ad) or selecting a specific feature of content (as in the case of a user selecting a "Read More" link within ad copy). Additionally, interaction information may also comprise actions that aren't necessarily affirmative with regard to the content being provided, as in the case of a user closing out content, navigating away from content or doing nothing at all in response to the content. Further still, the types of actions captured and tracked may be depend on the user device being used. For example, in the case of web-based content accessed via a computing device such as a laptop or desktop computer, such actions may be tabulated in the form of impressions, clicks or time spent on a given page, as known in the art. Alternatively, for content provided via a TV display and web-to-TV platform, things such as specific videos watched and/or completed may also be captured. Regardless, a beneficial feature of capturing a user's interaction information in this manner (i.e., according to which device or device type a user is using at any given time) is the ability to differentiate within his/her profile how he/she interacts with content across different user devices.

Referring once again to the multi-device access embodiment, assume a user has chosen to access content via a first user device, e.g., the TV display 302/platform 312 via the marketing widget 502. Responsive to this, the controller provides first content to the user via the first user device (and any intervening communication network). Using techniques well known in the art, the first user device provides the first content to the user. For example, in the case that the first content comprises text and images embedded in a web page, the first user device (in the current example, the web-to-TV platform 312) interprets the web page information (e.g., HTML coding) and causes the first content to be displayed in an appropriately sized window (e.g., shopping window 212) on the TV display 302. As another example, if the first content comprises a sound file encoded as a .mp3 file (i.e., in the well-known, MPEG-1 or MPEG-2 Audio Layer III format), then the first user device can instantiate a suitable .mp3 file decoder. Of course, other examples of suitable presentation techniques similar to those mentioned above will be apparent to one of ordinary skill in the art, and the instant disclosure is not limited in this regard.

As described above, the user device receives user input in response to the first content being provided and provides the user input to the controller as first interaction information using known techniques. Thereafter, the same user may choose to access the controller or a website 336 using a second user device such as, in this instance, a computing device. As used herein, a computing device is distinct from a web-to-TV platform in combination with a TV display in the sense that it is capable of directly accessing content via the intervening communication networks (e.g., accessing websites via the Internet/World Wide Web). For example, such computing devices may comprise general computing devices, such as laptop or desktop computers or more specialized computing devices, such as mobile phones, media players, personal digital assistants, etc.

As in the case of the user accessing content using the first user device, the user's access via a the second user device is captured by the controller via the customer ID management unit 504. Furthermore, as noted above, the customer ID management unit 504 can keep track of the various devices and device types associated with the user. For example, devices and/or their types may be tracked according to device make/model information, manufacturer, serial codes, feature lists, etc. tabulated and stored within the customer ID management unit 504. As used herein, such device types are differentiated according to characteristics of devices that potentially affect which content should be provided to a given device. For example, device types may be separated according to size of their respective displays, as in the case where a mobile phone will have a relatively small display area, whereas a desktop computer will have a relatively large display area. In a similar vein, the download capability of each device may serve as a distinguishing characteristic. For example, a TV display coupled to a web-to-TV platform will typically have relatively large download bandwidth capability, whereas a mobile device will often have a relatively small download bandwidth capability. Further distinguishing characteristics may comprise the relative degrees of user interaction capabilities (e.g., keyboard only versus multiple input modalities) or diversity of playback capabilities. Once again, the instant disclosure is not limited in this regard. As described below, information such as a user device type may be used to determine which content to provide to a user.

Referring once again to the multi-device access embodiment, based on the first content having been provided to the user and the first interaction information received in response thereto, as maintained by the interaction tracker 508, the controller can subsequently determine second content to be provided to the second user device. That is, notwithstanding the fact that the user has used different devices, the controller can take into account the fact that the first content was previously sent to the first device when determining which content to provide to the second device. Additionally, the second content can be further identified based on knowledge regarding how the user interacted with the first content. In one embodiment, the determination of the second content to provide to the second user device may be performed by the content server 510 based on the data supplied by the customer ID management unit 504, the customer profiling unit 506 and/or the interaction tracker 508.

For example, in the case of advertising content being provided to the user and where the first user device is a web-to-TV platform/TV display, the first content may comprise a video for Company A's sports utility vehicle designed to visually emphasize the vehicle's ruggedness and power. Furthermore, assume the user interacted with the first content by clicking on a button to obtain additional pricing and financing information. Thereafter, the same user is identified as using a smartphone (as the second user device) to access a website for Company A. In this instance, the controller first recognizes that the user has previously been provided the first content, which lead the user to interact with the content in a relatively positive manner (i.e., inquiring about pricing and financing information). With this insight, the controller is then able to determine that it would be most beneficial to provide second content to the user in which various technical specifications for Company A's sports utility vehicle are compared to the nearest competitor's specifications. Furthermore, appreciating the fact that the second user device is a mobile phone and therefore likely has a relatively low download bandwidth, the controller may include relatively low resolution images of the sports utility vehicle in the second content, thereby minimizing the bandwidth required to quickly download the second content to the second user device.

In another embodiment, the first and second content can be related is a serial fashion, as in the case where the first and second content are intended to be viewed in succession. For example, in the case of installments of a television program available for viewing at any time, the controller can employ its knowledge that the user most recently viewed the tenth episode of a program's current season. Thus, when the user is once again detected by the controller, it can offer the eleventh episode for immediate downloading. As before, further knowledge of the type of the second user device permits the controller to select the second content to be most compatible with the characteristics of the second user device.

In yet another embodiment, the controller can take into account not only the user's first interaction information, but can also incorporate knowledge about the user's interaction history of which the first interaction information is but a small part. That is, over time, the controller can store the user's interaction information for not only the first content, but also for any content that has been previously provided to the user. With this interaction history and knowledge of the characteristics of the prior content provided to the user, the controller can model the user's expected behavior (using, for example, well-known regression analysis techniques) to understand what types of content could be provided to the user. For example, the user's interaction history may indicate that he/she is most likely interact with advertising content when the content includes text regarding discounted products, incorporates classical music, etc.

Given the ability to collect highly specific, context-dependent user interaction information across multiple user devices, it is possible to develop understanding not only about individual users, but also the characteristics of specific pieces of content, particularly advertising content. For example, a user's interaction information for a given piece of content can be combined and tabulated with user interaction information for a plurality of other users for that same piece of content (or for content sharing similar or even identical characteristics of the given piece of content) to develop an understanding about how users generally react to such content. To this end, the campaign dashboard 512 can leverage such collective interaction information to assess the effectiveness of a given piece of content or content exhibiting a certain characteristic. For example, the campaign dashboard 512 can determine that content using currently popular music, while effective for users of a certain demographic (in terms of clicks for additional information, for example) is actually detrimental to another demographic group. Further, such analysis may suggest further data types that would be beneficial for developing even further understanding of individual users. For example, the collective interaction information may determine that users that are likely to be heavy business travelers react particularly well to a certain type of content. Based on this, an administrator or other person responsible for an advertising campaign may modify operation of the customer ID management unit 504 to seek out location information for users where it might be available, e.g., via status updates on social media websites, so that location-specific content may be subsequently provided to such users.

As further noted above, the return on investment (ROI) tracker 514 can also leverage the collective interaction information to correlate the investment in certain advertising or marketing content with specific user actions across a broad (or comparatively narrow, as desired) sampling of users. For example, the ROI tracker 514 could indicate that, while users apparently found advertising content with a science fiction theme interesting (as indicated, for example, by a relatively large number of page hits for that content), such users were seldom taking further actions to complete a purchase. In this sense, if the goal of the content is to simply build brand awareness, the ROI tracker 514 may indicate that the content has provided a solid return on the investment. On the other hand, if the content is intended to bring in new customers, then the ROI tracker 514 may indicate that the content is underperforming relative to its investment.

A feature of the embodiments described herein is that multiple web-to-TV platform types may be supported by a single server, enabling standardized content to be adapted for display via each platform type. This avoids the need for marketing designers to generate platform specific marketing content, and also leads to a versatile solution which can be adapted to new platform types by the addition of new communications modules. Furthermore, various other embodiments described herein enable cross-platform coordination of content presentation such that an individual user's experience is enhanced through the provision of relevant content.

Having thus described illustrative embodiments of the disclosure, various alterations, modifications and improvements will readily occur to those skilled in the art.

For example, while a few examples of types of web-to-TV platforms have been described, it will be apparent to those skilled in the art that the embodiments described herein could be adapted to a wide range of different platform types.

Furthermore, while particular examples have been provided of the variations between platform types that can be supported by the communications modules 328 to 332, it will be apparent to those skilled in the art that these modules could be arranged to support other differences, such as color, and/or style differences, etc.

Such alterations, modifications and improvements are intended to be within the spirit and scope of the disclosure. Accordingly, the foregoing description is by way of example only and is not intended to be limiting. The disclosure is limited only as defined in the following claims and the equivalent thereto.

What is claimed is:

1. A method for providing content to a user, the method comprising:
    providing, by a controller operatively connected to and capable of communicating via at least one communication network, first content to a first user device corresponding to the user;
    determining, by the controller, interaction by the user with the first content to provide first interaction information, wherein the first interaction information includes affirmative and non-affirmative actions performed by the user with respect to the first content;
    analyzing, by the controller, data related to the interaction by the user with the first content;
    searching, by the controller, based on the analysis of the data related to the interaction by the user with the first content, a source that is not related to the user, wherein the source includes a website that is not related to the user;
    analyzing, by the controller, based on the search of the source that is not related to the user, results of the search of the source that is not related to the user;
    augmenting, by the controller, based on the analysis of the results of the search of the source that is not related to the user, the data related to the interaction by the user with the first content with the results of the search of the source that is not related to the user; and
    providing, by the controller via the at least one communication network, second content to a second user device corresponding to the user based on prior provision of the first content to the first user device, the first interaction information, the augmenting of the data related to the interaction by the user with the first content with the results of the search of the source that is not related to the user, and technical capabilities of the second user device.

2. The method of claim 1, wherein the first user device comprises a television operatively connected to the at least one communication network via a web-to-TV platform and the second user device comprises a computing device.

3. The method of claim 1, wherein providing the second content further comprises providing the second content based on a user interaction history for the user comprising previous interaction information by the user in response to other content presented to the user.

4. The method of claim 1, wherein providing the second content further comprises determining that the second content is serially related to the first content such that the second content is intended to be viewed in numerical succession to the first content based on an episode number of the first content.

5. The method of claim 1, wherein providing the second content further comprises determining that the first user device comprises a first type of device and the second user device comprises a second type of device.

6. The method of claim 1, wherein providing the first content and providing the second content further comprise providing first advertising content and providing second advertising content.

7. The method of claim 1, further comprising:
    combining, by the controller, the first interaction information with interaction information for other users associated with the first content to provide collective interaction information for the first content; and
    assessing, by the controller, effectiveness of the first content based on the collective interaction information.

8. The method of claim 1, wherein the non-affirmative actions include closing out the first content, navigating away from the first content, and performing no action in response to the first content.

9. The method of claim 1, wherein the non-affirmative actions include navigating away from the first content.

10. The method of claim 1, further comprising:
    tracking the affirmative and non-affirmative actions performed by the user with respect to the first content to determine a progression of the user compared to an overall advertising campaign.

11. The method of claim 1, further comprising:
analyzing the first interaction information to correlate an investment in advertising with the affirmative and non-affirmative actions performed by the user across a sampling of users.

12. The method of claim 1, further comprising:
analyzing the first interaction information to monitor an investment in marketing by comparing a cost of implementation of marketing solutions related to the marketing with results achieved.

13. The method of claim 1, further comprising:
determining a type of the second user device,
wherein, providing, by the controller via the at least one communication network, the second content to the second user device corresponding to the user based on prior provision of the first content to the first user device, the first interaction information, and the augmenting of the data related to the interaction by the user with the first content with the results of the search of the source that is not related to the user further comprises:
providing the second content to the second user device by selecting the second content that is most compatible with characteristics of the determined type of the second user device from a plurality of available and compatible second contents for the second user device.

14. The method of claim 1, wherein providing, by the controller via the at least one communication network, second content to the second user device corresponding to the user based on prior provision of the first content to the first user device, the first interaction information, and the augmenting of the data related to the interaction by the user with the first content with the results of the search of the source that is not related to the user further comprises:
modeling an expected behavior of the user to provide the second content to the second user device.

15. An apparatus comprising:
a processor; and
a storage device operatively connected to the processor and having stored thereon instructions that, when executed by the processor, cause the processor to:
provide first content to a first user device via at least one communication network;
determine interaction by a user of the first user device with the first content to provide first interaction information, wherein the first interaction information includes affirmative and non-affirmative actions performed by the user with respect to the first content;
analyze data related to the interaction by the user with the first content;
search, based on the analysis of the data related to the interaction by the user with the first content, a source that is not related to the user, wherein the source includes a website that is not related to the user;
analyze, based on the search of the source that is not related to the user, results of the search of the source that is not related to the user;
augment, based on the analysis of the results of the search of the source that is not related to the user, the data related to the interaction by the user with the first content with the results of the search of the source that is not related to the user; and
provide second content to a second user device via the at least one communication network based on prior provision of the first content to the first user device, the first interaction information, the augment of the data related to the interaction by the user with the first content with the results of the search of the source that is not related to the user, and technical capabilities of the second user device.

16. The apparatus of claim 15, wherein those instructions that cause the processor to provide the second content are further operative to cause the processor to provide the second content based on a user interaction history for the user comprising previous interaction information by the user in response to other content presented to the user.

17. The apparatus of claim 15, wherein those instructions that cause the processor to provide the second content are further operative to cause the processor to determine that the second content is serially related to the first content such that the second content is intended to be viewed in numerical succession to the first content based on an episode number of the first content.

18. The apparatus of claim 15, the storage device further comprising instructions that, when executed by the processor, cause the processor to:
combine the first interaction information with interaction information for other users associated with the first content to provide collective interaction information for the first content; and
assess effectiveness of the first content based on the collective interaction information.

19. A non-transitory, machine-readable medium having stored thereon instructions that, when executed by a processor, cause the processor to:
provide first content to a first user device via at least one communication network;
determine interaction by a user of the first user device with the first content to provide first interaction information, wherein the first interaction information includes affirmative and non-affirmative actions performed by the user with respect to the first content;
analyze data related to the interaction by the user with the first content;
search, based on the analysis of the data related to the interaction by the user with the first content, a source that is not related to the user, wherein the source includes a website that is not related to the user;
analyze, based on the search of the source that is not related to the user, results of the search of the source that is not related to the user;
augment, based on the analysis of the results of the search of the source that is not related to the user, the data related to the interaction by the user with the first content with the results of the search of the source that is not related to the user; and
provide second content to a second user device via the at least one communication network based on prior provision of the first content to the first user device, the first interaction information, the augment of the data related to the interaction by the user with the first content with the results of the search of the source that is not related to the user, and technical capabilities of the second user device.

20. The machine-readable medium of claim 19, wherein those instructions that cause the processor to provide the second content are further operative to cause the processor to provide the second content based on a user interaction history for the user comprising previous interaction information by the user in response to other content presented to the user.

21. The machine-readable medium of claim 19, wherein those instructions that cause the processor to provide the second content are further operative to cause the processor to determine that the second content is serially related to the first content such that the second content is intended to be viewed in numerical succession to the first content based on an episode number of the first content.

22. The machine-readable medium of claim 19, further comprising instructions that, when executed by the processor, cause the processor to:
   combine the first interaction information with interaction information for other users associated with the first content to provide collective interaction information for the first content; and
   assess effectiveness of the first content based on the collective interaction information.

23. A method for receiving content, the method comprising:
   receiving, by a user device from a controller via at least one communication network, content that is selected for provision to the user device based on provision by the controller via the at least one communication network of prior content to another user device, interaction by a user with the prior content via the other user device, augmentation of data related to the interaction by the user with the prior content with results of a search of a source that is not related to the user, and technical capabilities of the user device,
   the source includes a website that is not related to the user,
   the user device and the other user device being associated with the user,
   the interaction by the user including affirmative and non-affirmative actions performed by the user with respect to the prior content, and
   the augmentation of the data related to the interaction by the user with the prior content with the results of the search of the source that is not related to the user being based on
      an analysis of the data related to the interaction by the user with the prior content,
      a search, based on the analysis of the data related to the interaction by the user with the prior content, of the source that is not related to the user,
      an analysis, based on the search of the source that is not related to the user, of the results of the search of the source that is not related to the user, and
      the augmentation, based on the analysis of the results of the search of the source that is not related to the user, of the data related to the interaction by the user with the prior content with the results of the search of the source that is not related to the user; and
   providing, by the user device, the content to the user.

24. A user device capable of communicating via at least one communication network, the user device further comprising:
   a processor;
   a storage device operatively connected to the processor and having stored thereon instructions that, when executed by the processor, cause the processor to:
      receive, from a controller operatively connected to and capable of communicating via the at least one communication network, content that is selected for provision to the user device based on provision by the controller via the at least one communication network of prior content to another user device, interaction by a user with the prior content via the other user device, augmentation of data related to the interaction by the user with the prior content with results of a search of a source that is not related to the user, and technical capabilities of the user device,
      the source includes a website that is not related to the user,
      the interaction by the user including affirmative and non-affirmative actions performed by the user with respect to the prior content, and
      the augmentation of the data related to the interaction by the user with the prior content with the results of the search of the source that is not related to the user being based on
         an analysis of the data related to the interaction by the user with the prior content,
         a search, based on the analysis of the data related to the interaction by the user with the prior content, of the source that is not related to the user,
         an analysis, based on the search of the source that is not related to the user, of the results of the search of the source that is not related to the user, and
         the augmentation, based on the analysis of the results of the search of the source that is not related to the user, of the data related to the interaction by the user with the prior content with the results of the search of the source that is not related to the user; and
      provide the content to the user.

25. A non-transitory, machine-readable medium having stored thereon instructions that, when executed by a processor, cause the processor to:
   receive, from a controller operatively connected to and capable of communicating via at least one communication network, content that is selected for provision to a user device based on provision of prior content to another user device, interaction by a user with the prior content via the other user device, augmentation of data related to the interaction by the user with the prior content with results of a search of a source that is not related to the user, and technical capabilities of the user device,
   the source includes a website that is not related to the user,
   the interaction by the user including affirmative and non-affirmative actions performed by the user with respect to the prior content, and
   the augmentation of the data related to the interaction by the user with the prior content with the results of the search of the source that is not related to the user being based on
      an analysis of the data related to the interaction by the user with the prior content,
      a search, based on the analysis of the data related to the interaction by the user with the prior content, of the source that is not related to the user,
      an analysis, based on the search of the source that is not related to the user, of the results of the search of the source that is not related to the user, and
      the augmentation, based on the analysis of the results of the search of the source that is not related to the user, of the data related to the interaction by the user with the prior content with the results of the search of the source that is not related to the user; and
   provide the content to the user.

26. A system for providing content to a user, comprising:
   a first user device corresponding to the user, the first user device operatively connected to and capable of communicating via at least one communication network;

a second user device, of a different type relative to the first user device, corresponding to the user, the second user device operatively connected to and capable of communicating via the at least one communication network; and a controller, operatively connected to and capable of communicating via the at least one communication network, that provides first content to the first user device, determines interaction by the user with the first content to provide first interaction information and provides second content to the second user device based on prior provision of the first content to the first user device, the first interaction information, augmentation of data related to the interaction by the user with the first content with results of a search of a source that is not related to the user, and technical capabilities of the second user device, wherein the source includes a website that is not related to the user, the first interaction information includes affirmative and non-affirmative actions performed by the user with respect to the first content, and the augmentation of the data related to the interaction by the user with the first content with the results of the search of the source that is not related to the user is based on an analysis of the data related to the interaction by the user with the first content, a search, based on the analysis of the data related to the interaction by the user with the first content, of the source that is not related to the user, an analysis, based on the search of the source that is not related to the user, of the results of the search of the source that is not related to the user, and the augmentation, based on the analysis of the results of the search of the source that is not related to the user, of the data related to the interaction by the user with the first content with the results of the search of the source that is not related to the user.

* * * * *

UNITED STATES PATENT AND TRADEMARK OFFICE
CERTIFICATE OF CORRECTION

PATENT NO.         : 9,563,899 B2
APPLICATION NO.    : 13/249778
DATED              : February 7, 2017
INVENTOR(S)        : Ana Cristina Andres Del Valle et al.

Page 1 of 1

It is certified that error appears in the above-identified patent and that said Letters Patent is hereby corrected as shown below:

On the Title Page

At Item (30), Foreign Application Priority Data "10306127" should be "10306127.1".

Signed and Sealed this
Fifth Day of September, 2017

Joseph Matal
*Performing the Functions and Duties of the*
*Under Secretary of Commerce for Intellectual Property and*
*Director of the United States Patent and Trademark Office*